United States Patent Office 3,312,876
Patented Apr. 4, 1967

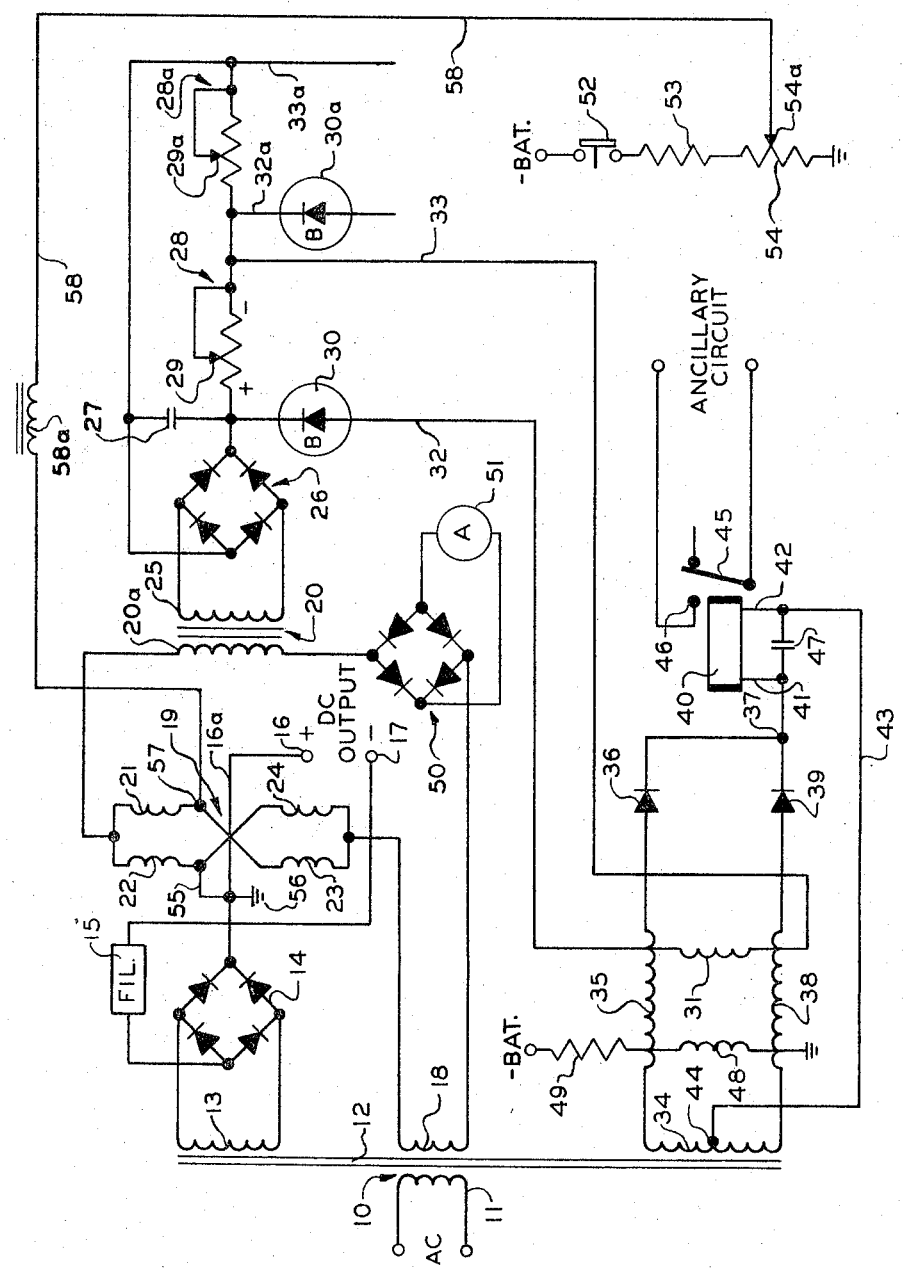

3,312,876
CURRENT RESPONSIVE SIGNALING SYSTEM
George H. Pohm, Lorain, and Jefferson T. Mitchell, Bay Village, Ohio, assignors to Lorain Products Corporation, a corporation of Ohio
Filed May 2, 1963, Ser. No. 277,660
4 Claims. (Cl. 317—148)

This invention relates to signaling circuits and is directed more particularly to circuitry adapted to be energized when a predetermined load current is attained in an associated device.

In electrical equipment used to supply power, it is frequently necessary to know the range of output load in which the equipment is operating. For example, in the telephone industry, battery charging equipment operating from the A.-C. lines is used to supply D.-C. power to the load in order to float the batteries at a predetermined voltage per cell while the commercial A.-C. line power is available and to recharge the batteries after any interruption of the commercial A.-C. power. In the use of such equipment it is desirable that signals be given, or supplementary equipment be turned on, as predetermined values of output load occur. These signals may be derived from relays which are operated at selected values of output load current of the charger to energize or de-energize visual or audible signals or ancillary equipment as determined by the manner of connection of the relay contacts.

Each relay, activated as a selected output load current is attained, may be made to function in various ways. For example, the contacts of a relay may be normally closed to complete the circuit of ancillary equipment so that energization of the relay will cause the contacts to be opened breaking the ancillary circuit. On the other hand, relays having normally open contacts or a plurality of contacts, some normally open and some normally closed, may be used.

As is well known, relays do not always operate at an exact voltage but have a voltage range in which "pull in" will occur. A voltage greater than the upper limit of the range will cause positive "pull in" of the relay while a voltage less than the lower limit will allow positive release.

Accordingly it is an object of the invention to provide improved load responsive and sensing circuitry which immediately energizes a relay when a precisely selected value of output load from a device such as a power supply is attained.

It is another object of the invention to provide circuitry which is highly sensitive in that the signaling circuitry becomes operative upon very slight increase in load current above a predetermined load current value and becomes inoperative upon very slight decrease below that value.

It is still another object of the invention to provide, in signaling circuitry, means to pass current through the control winding of a transductor upon attainment of a predetermined output load current thereby to energize the signaling circuitry.

A further object of the invention is to provide circuitry which utilizes a relatively small current which is proportional to the output current of associated, controlled equipment to thereby reduce the size of components and the power required to operate the signaling circuitry and to render more precise the operation of the signaling circuit.

Another object of the invention is to provide circuitry into which any desired number of signaling circuits may be incorporated and which provides means for severally selecting a value of output load current at which each signaling circuit operates so that they may successively be cut in the circuit as required by load increase. This multiple arrangement of signaling circuits is advantageous in that a plurality of ancillary circuits may be accommodated, each being operative above a selected value of output load current and inoperative below that value.

Still another object of the invention is to provide signaling circuitry in which the signaling circuit section is isolated from the power circuit section by means of a load current responsive proportioning circuit section and a sensing circuit section whereby the sensitive load responsive components are not subjected to the rated power of the associated equipment in which the signaling circuitry is incorporated.

It is a still further object of the invention to provide simulating circuitry whereby a signaling circuit or circuits may be adjusted to operate at a precise value of output load from a device such as a power supply but without such output load existing during the adjustment.

Another object of the invention is to provide circuitry which can be adjusted to simulate, in a load current responsive circuit, any value of any current that will appear in an associated power supply circuit during normal operation thereof.

Still another object of the invention is to provide, in combination with signaling circuitry means which opposes the effect of a sensing circuit to establish an operating range such that a signaling means is inoperative until a breakdown device in the sensing circuit allows current to flow therein.

Many other objects and advantages of the invention will become apparent from the following description and the accompanying single figure which is a schematic diagram of a circuit embodying the invention.

Generally, as shown in the single figure of the drawing which is a schematic diagram of a circuit exemplifying the use of the invention, the signaling circuit and its associated parts include a power circuit section, a load current-responsive section and a signaling circuit section, all energized by suitable source shown herein as a standard A.-C. line source. Additionally, there is provided between the load responsive circuit section and the signaling circuit section, a sensing circuit. In accordance with the invention, the load responsive circuit and the signaling circuit operate in response to predetermined load current conditions in the power circuit while the sensing circuit responds to a predetermined voltage drop in the load responsive circuit to control the signaling circuit.

Any suitable alternating current source such as a transformer 10 having a primary 11 and a core 12 may be utilized to energize the circuit embodying the invention.

The power circuit, shown herein for descriptive purposes as a rectifier suitable for charging telephone exchange batteries and supplying rectifier power to the exchange includes a secondary 13, a full wave bridge rectifier 14, suitable filtering means 15 and D.-C. output terminals 16 and 17.

The magnitude of the load current in the power circuit is the factor to which the signaling circuit of the invention is responsive. It is necessary that as a precise, predetermined magnitude of load current is attained in the power circuit, an alarm, either visible or audible, be energized or supplementary equipment be connected into the circuit to assume any additional load. The signaling response must be precise in that below a predetermined current magnitude the signaling circuit will not be energized whereas above current of that predetermined magnitude the signaling circuit must be energized.

In order that the magnitude of current in the power circuit described above may be faithfully reflected, there is provided a load current responsive circuit having a winding 18, serving as an A.-C. source which feeds a series loop including a transductor 19 shown symbolically herein, and a rectifier 26 shown as energized through a current transformer 20.

The transductor 19 includes windings 21 and 24 wound on one core and windings 22 and 23 wound on another core connected in the configuration shown. The impedance of the transductor 19 is controlled by the magnitude of the current flowing through the output lead 16a of the power circuit which passes through both of said cores. Accordingly it will be seen that, by means of the transductor 19, the flow of current through the primary winding 20a will be a function of the load current in the lead 16a.

In order to reduce the size of the components required in the remainder of the circuit and for other advantages which are obvious to those skilled in the art, the turns ratio of the transductor 19 is such that the load current responsive circuit carries current which is much less than but directly proportional to the current in the power circuit.

The load current responsive circuit includes a current transformer 20 having a primary 20a and a secondary 25, a second full wave bridge rectifier 26, suitable filtering means 27 and a variable resistor 28, which serves as load current responsive means. The filter 27 and the variable resistor 28 are shunt connected with the D.-C. terminals of the bridge rectifier 26 while the winding 25 is connected across the A.-C. terminals thereof.

The transformer 20 serves to isolate the load circuit from the sensing circuit and may be omitted where such isolation is not required.

From the foregoing it will be seen that the current flowing through the rectifier 26 is proportional to that flowing through the transductor 19 which, in turn, is controlled by the load current in the power circuit. Accordingly, the voltage drop across the variable resistor 28 is likewise proportional to the current flowing through the power circuit. To the end that the resistance of the resistor 28 may be varied to determine the magnitude of current in the power circuit at which the signaling circuit will be energized in a manner to be presently described, there is provided a slider 29 on the resistor 28.

A sensing circuit, in order to operate in conjunction with the variable resistor 28, includes a loop having a breakdown, zener diode 30 which, as a voltage sensitive device, serves as off-on conducting means and a series connected control coil 31, both connected across the variable resistor 28 through leads 32 and 33. The sensing circuit, with the variable resistor, may be considered as part of the load current responsive circuit.

Since the breakdown diode by its nature is a blocking device in a circuit until a voltage greater than its breakdown voltage is impressed upon it, so long as the variable resistor 28 develops a voltage less than the breakdown voltage of a zener 30, no current will flow through the control coil 31. However, with an increase of load current in the power circuit, and thus an increase of current in the load current responsive circuit, a point will be reached at which the voltage drop across the resistor 28 is greater than the breakdown voltage of the zener 30. At this point current will flow in the sensing circuit through leads 32 and 33 and thus through the control coil 31 to, in turn, control the signaling circuit to be described presently. It will be understood that other types of voltage sensitive or non-linear resistive diodes may be used in place of the zener diode.

In view of the foregoing it will be seen that by means of circuitry thus far described, the flow of current in the control coil 31 is regulated in an "off-on" manner in accordance with the voltage relationship between zener diode 30 and the resistor 28 which, in turn, is responsive to a particular magnitude of current in the power circuit. Furthermore, the particular magnitude of load current in the power circuit at which the zener diode breaks down can be predetermined by operation of the slider 29 in the variable resistor 28.

The signaling circuit section comprises a secondary winding 34 energized from the A.-C. source. One end of the winding 34 is connected through a transductor coil 35 and a diode 36 to a junction 37 while the other end of the coil is connected to this junction point through a transductor winding 38 and a diode 39. One end of the coil of a suitable relay 40 is connected to the junction point 37 through a lead 41 while the other end of the coil of this relay is connected by means of a lead 42 and a lead 43 to a center tap 44 of the secondary winding 34. The relationship of transductor coils 35 and 38 with the control coil 31 is such that when no current is flowing through the coil 31 as a result of the low voltage drop across resistor 28 and thus the blocking action of the zener 30, the coils 35 and 38 have high impedance. This condition in the signaling circuit prevents the relay from being energized with the result that the relay armature 45 is in the position shown in the drawing and the ancillary circuit is open. However, when the current in the power circuit rises to a predetermined value and the zener diode 30 breaks down as a result of increase in voltage across the resistor 28 to permit a flow of current through the coil 31, the impedance of the transductor coils 35 and 38 is greatly reduced.

Thus the resulting flow of current in the coil of the relay 40 can draw the armature in a closed position and contact 46 will energize the ancillary circuit. As indicated previously, this ancillary circuit may be utilized to energize audible or visual signals or may cut in supplementary power equipment to energize the load along with the rectifier energized by the secondary winding 13.

As shown in the drawing, a plurality of resistors, sensing circuits and signaling circuits may be incorporated in the load responsive circuit section. Such an arrangement is shown at 28a, 29a, 30a, 32a and 33a. The sensing leads 32a and 33a are ideally connected to the control element of a signaling circuit as, for example, the control winding of a transductor as has been explained previously. Thus a plurality of ancillary signaling devices or generators may be energized or de-energized progressively over a wide range of load current variations.

If desired, the relay assembly may include a capacitor 47 across the winding thereof so that ripple is eliminated or greatly reduced from the D.-C. energizing power provided by the center tapped winding 34 and the diodes 36 and 39.

To the end that the impedance of windings 35 and 38 is maintained at a value sufficiently high that the relay 40 is not energized when no current flows through the control coil 31, there is provided a bias winding 48 connected to a suitable D.-C. source through a suitable resistor 49 calibrated to provide the value of current in the coil 48 to supply the proper bias.

The effect of the bias is to displace the characteristic curve of the transductor so that substantially greater current is required in control winding 31 to reach the turn-on point of the transductor than would be so if no bias were present. Thus the relay does not operate when no current flows in the sensing circuit. This current necessary to reach the transductor turn-on point will be supplied to control winding 31 when zener diode 30 breaks down due to a predetermined current having been attained in lead 16a. Thus, the net effect of bias winding 48 and the sensing circuit which includes zener diode 30 and control winding 31 upon the transductor is the establishment of an operating range such that the impedance of gate windings 35 and 38 is high until the zener diode 30 passes current through control winding 31.

Thus it will be seen that by means of the improved circuitry of the present invention, the operation of a circuit controlling device such as a relay is obtained not only instantaneously to energize an ancillary circuit but also the value of the load current of the power circuit at which relay operation occurs may be predetermined with precision.

As indicated previously, while only one signaling circuit is described herein, the circuit configuration of the present invention is such that a plurality of signaling circuits or a plurality of supplementary devices may be energized from the load responsive circuit. With the present invention this may be accomplished by incorporating additional resistors of the type shown at 28 and 28a into the load current responsive circuit.

Each of the additional signaling circuits may be set to operate at a different value of output current from the main D.-C. rectifier. Thus, operation of any number of ancillary circuits may be severally and selectively obtained at predetermined values of output load current. For example, with four resistors and sensing circuits and signaling circuits having adjustable load ranges of from 1% to 10%, 10% to 50%, 50% to 100% and 50% to 125% respectively, energizing of the signaling instrumentalities such as relays can be obtained at 10%, 25%, 75% and 100% of output load, if desired, to operate ancillary equipment or to give an alarm as the load current progressively attains the last named values.

Such an arrangement is of particular advantage in the telephone industry where load variation between peak load and low load periods is sometimes of considerable magnitude. The circuit of the present invention is well adapted to cut-in and remove from the circuit additional chargers as required by the load.

To the end that each of the signaling circuits may be adjusted to operate at a desired value of output load current but without the inconvenience of connecting a load to output terminals 16 and 17 there is provided an ammeter circuit and a load simulating circuit which includes a variable current means.

The ammeter circuit includes a full wave bridge rectifier 50 having A.-C. terminals thereof connected as shown between secondary windings 18 of transformer 10 and primary winding 20 of the current transformer. A suitable ammeter 51 is connected across D.-C. terminals of rectifier 50. Thus it will be seen that ammeter 51 indicates the average A.-C. current flowing in the load current responsive circuit at anytime.

Furthermore, since the current in the load current responsive circuit is proportional to the current delivered to the D.-C. output terminals 16 and 17 when the load simulating circuit is not in use, ammeter 51 may be calibrated to indicate the current being drawn by a load from terminals 16 and 17. Thus, through the use of the load current responsive circuit, a low range ammeter may be used to indicate the magnitude of current flowing in a high current circuit. An additional advantage is the elimination of a shunt normally required across an ammeter used in a load circuit.

The load simulating circuit operates to produce current flow in the load current responsive circuit so that no current is required in lead 16a to produce current through and therefore, voltage on, variable resistors 28 and 28a. Hence, by adjusting the simulating circuit to obtain a particular current indication on ammeter 51, the same conditions are imposed on the sensing and signaling circuit as would occur if a current of the magnitude indicated by the ammeter were drawn from D.-C. output terminals 16 and 17.

The simulating circuit includes a test key 52, a resistor 53 and a potentiometer 54 serially connected as shown between negative battery and ground. A point between windings 22 and 24 of transductor 19 is connected to lead 16a by a lead 55, lead 16a being grounded at 56. Thus, when test key 52 is depressed, current will flow from ground 56, through lead 55 dividing so that half the current flows through windings 22 and 21 to a point 57 and the other half of the current flows through windings 24 and 23 to point 57 where it recombines with the D.-C. current from windings 22 and 21.

From point 57 the current is directed by a lead 58 to a wiper arm 54a of potentiometer 54 where it adds to the current flowing from ground through potentiometer 54, resistor 53 and test key 52 to negative battery. Since wiper arm 54a is adjustable, it will be seen that potentiometer 54 serves as a variable current means. Lead 58 includes a choke coil 58a which serves to establish a mode of operation for transductor 19 such that the voltage developed on winding 25 during operation of the simulating circuit is a square wave just as it is under normal load conditions.

The D.-C. current supplied from the variable current means and flowing through windings 21, 22, 23 and 24 as just described varies the impedance of transductor 19 to produce in the load current responsive circuit a current which is equal to the current in the simulating circuit.

It will be seen that by adjusting wiper arm 54a while test key 52 is depressed, the current in the load current responsive circuit may be varied to obtain any value corresponding to values obtainable due a variable load across output terminals 16 and 17. Thus, for any reading indicated on the ammeter when test key 52 is depressed, the same magnitude of current flows in the load current responsive circuit as would flow if the current indicated on the ammeter were drawn from terminals 16 and 17 by a load.

In order to set the values of D.-C. output current at which the signaling circuit will operate, it is only necessary to depress test key 52 and adjust wiper arm 54a to obtain the desired current indication on ammeter 51. With test key 52 still depressed, wiper arm 29 of potentiometer 28 is adjusted to initiate operation of the signaling circuit. If the test key 52 is now released, the signaling circuit will be energized in a manner explained previously when the current supplied to a load reaches that value which was indicated by ammeter 51 when wiper arm 29 was adjusted. Thus by means of the simulating circuit and the ammeter circuit, the values of output current at which signaling circuits are to operate can be selected without any current being drawn from output terminals 16 and 17. This is especially advantageous in the case of equipment having output in the hundreds of amperes and for which it would be extremely inconvenient to provide a variable load for the purposes of adjusting the signaling circuits.

It will be understood that the embodiments shown herein are for explanatory purposes and may be changed or modified without departing from the spirit and scope of the invention as set forth in the claims appended hereto.

What we claim is:

1. In combination in a signaling system, a power circuit section having input and output means, a load current responsive circuit section including a source of A.-C. power, a transductor, the impedance of said transductor being a function of current flow in said power circuit section, a recifier, means for electrically connecting the input of said rectifier between said source of A.-C. power and said transductor, variable resistive means connected across the output of said rectifier, a signaling circuit section including an A.-C. source, rectifying means, D.-C. operated signaling means, a transductor having gate windings and a control winding, means for connecting said gate windings between said A.-C. source and said signaling means through said rectifying means, means for connecting one end of said control winding to one end of said variable resistive means, voltage sensitive conducting means, means for connecting the other end of said control winding through said voltage sensitive conducting means to the other end of said variable resistive means whereby said signaling means is energized when said voltage sensitive conducting means is rendered conducting by a predetermined current flow in the power circuit, said predetermined current being selected by said variable resistor to establish the voltage drop thereacross.

2. In a signaling system, in combination, a power circuit section, voltage developing means responsive to the current output of said power circuit section, means for electrically associating said voltage developing means with the power circuit section a transductor having first and second gate windings, a control winding and a bias winding, a center tapped source of A.-C. power and having first and second terminals, a relay having terminals, first and second unidirectional conducting means, means for connecting one terminal of said relay to the center tap of said A.-C. source, means for connecting first said gate winding and first said unidirectional conducting means serially between the other terminal of said relay and said first terminal of said A.-C. source, means for connecting said second gate winding and said second unidirectional conducting means between said other terminal of said relay and said second terminal of said A.-C. source, zener diode means, means for connecting one end of said control winding to one end of said voltage developing means, means for connecting the other end of said control winding to the other end of said voltage developing means through said zener diode means, means for connecting said bias winding to a source of D.-C. potential whereby said gate windings of said transductor prevent current flow from said A.-C. source to said relay until said zener diode allows current to flow through said control winding.

3. In a circuit adapted to energize an ancillary circuit upon attainment of a predetermined load current in an associated power circuit, the combination of a load current responsive circuit section including variable impedance means, means for electrically associating the variable impedance means with the power circuit whereby the impedance of said variable impedance means is responsive to current flow in said power circuit, a source of power for said load current responsive section, current responsive means arranged to respond to changes in current flow through said variable impedance means, a sensing circuit section including said current responsive means together with a serially connected control winding and voltage sensitive conducting means, means for connecting said control means and said voltage sensitive conducting means serially across said current responsive means, a relay adapted to operate an ancillary circuit when energized, a source of A.-C. power for said relay, a transductor having gate windings interposed between said relay and said source of A.-C. power and operatively associated with said control winding, a bias winding having current supply means therefore and operatively associated with said gate windings thereby to displace the characteristic curve of said transductor to establish an operating range such that the turn-on point of said transductor is not reached below a predetermined value of load current in the power circuit.

4. In a circuit adapted to energize an ancillary circuit, the combination of a power circuit section, a load current responsive circuit section including variable impedance means the impedance of which is responsive to the output current of said power circuit section, variable current load simulating means, means for connecting said variable current means to said variable impedance means to vary the impedance thereof and the magnitude of the current through said load current responsive circuit section independently of current flow in said power circuit section, current responsive means arranged to respond to current flow in said load current responsive section, a sensing circuit, an ancillary circuit, a source of power for said ancillary circuit, voltage sensitive conducting means for connecting said sensing circuit between said current responsive means and said source of power to energize said ancillary circuit when a predetermined current in said current responsive circuit section is attained.

References Cited by the Examiner
UNITED STATES PATENTS

| | | | |
|---|---|---|---|
| 3,045,170 | 7/1962 | Howald | 321—25 |
| 3,083,330 | 3/1963 | Roth et al. | |
| 3,123,762 | 3/1964 | Throop. | |
| 3,199,015 | 8/1965 | Lackey et al. | 321—25 |
| 3,200,328 | 8/1965 | Green. | |
| 3,218,540 | 11/1965 | Jackson. | |

JOHN F. COUCH, *Primary Examiner.*

M. L. WACHTELL, *Assistant Examiner.*